United States Patent [19]
Andrews

[11] Patent Number: 6,021,171
[45] Date of Patent: Feb. 1, 2000

[54] MULTIPLEXING DECODER/COUNTER CIRCUIT FOR MONITORING QUADRATURE POSITION ENCODERS

[75] Inventor: J. Randolph Andrews, Campbell, Calif.

[73] Assignee: Douloi Automation, Inc., Campbell, Calif.

[21] Appl. No.: 08/935,325

[22] Filed: Sep. 22, 1997

[51] Int. Cl.$^7$ ...................................................... G07C 3/00
[52] U.S. Cl. ................................ 377/16; 377/49; 318/565
[58] Field of Search .................................... 377/3, 16, 39, 377/49; 318/565, 568.18, 625

[56] References Cited

U.S. PATENT DOCUMENTS 5,684,374 11/1997 Chaffee .................................... 318/616

*Primary Examiner*—Kenneth B. Wells
*Assistant Examiner*—Minh Nguyen
*Attorney, Agent, or Firm*—The Kline Law Firm

[57] ABSTRACT

A multiplexing decoder/counter circuit for monitoring quadrature position encoders. The system includes an edge detector, a position counter, a position latch, a capture latch, and compare management means. Addressable memory blocks are used throughout the design. Information from external differential receivers is directed into a single quadrature decoder circuit using a switch with an effective 16 to 1 selection. An axis scanning state machine addresses multiple memory block based functions simultaneously. Scanning is performed in a circuitous manner in conjunction with the switch. The total circular loop frequency for the sequence is chosen to be equal to or greater than the maximum encoder frequency required. At each visitation of any particular memory address, the state of the circuit is reestablished from the last visit by the scanning state machine. Any change in quadrature signals is noted, and any up or down count is accumulated to the position counter. This information is then stored back into memory and the system moves to the next memory location. The compare management information goes through a steering switch into a series of non-multiplexed compare latches to sustain hardware outputs even when a particular axis is not being selected. Each memory location in the control system corresponds to an independent motor.

3 Claims, 20 Drawing Sheets

FIGURE 1 - PRIOR ART

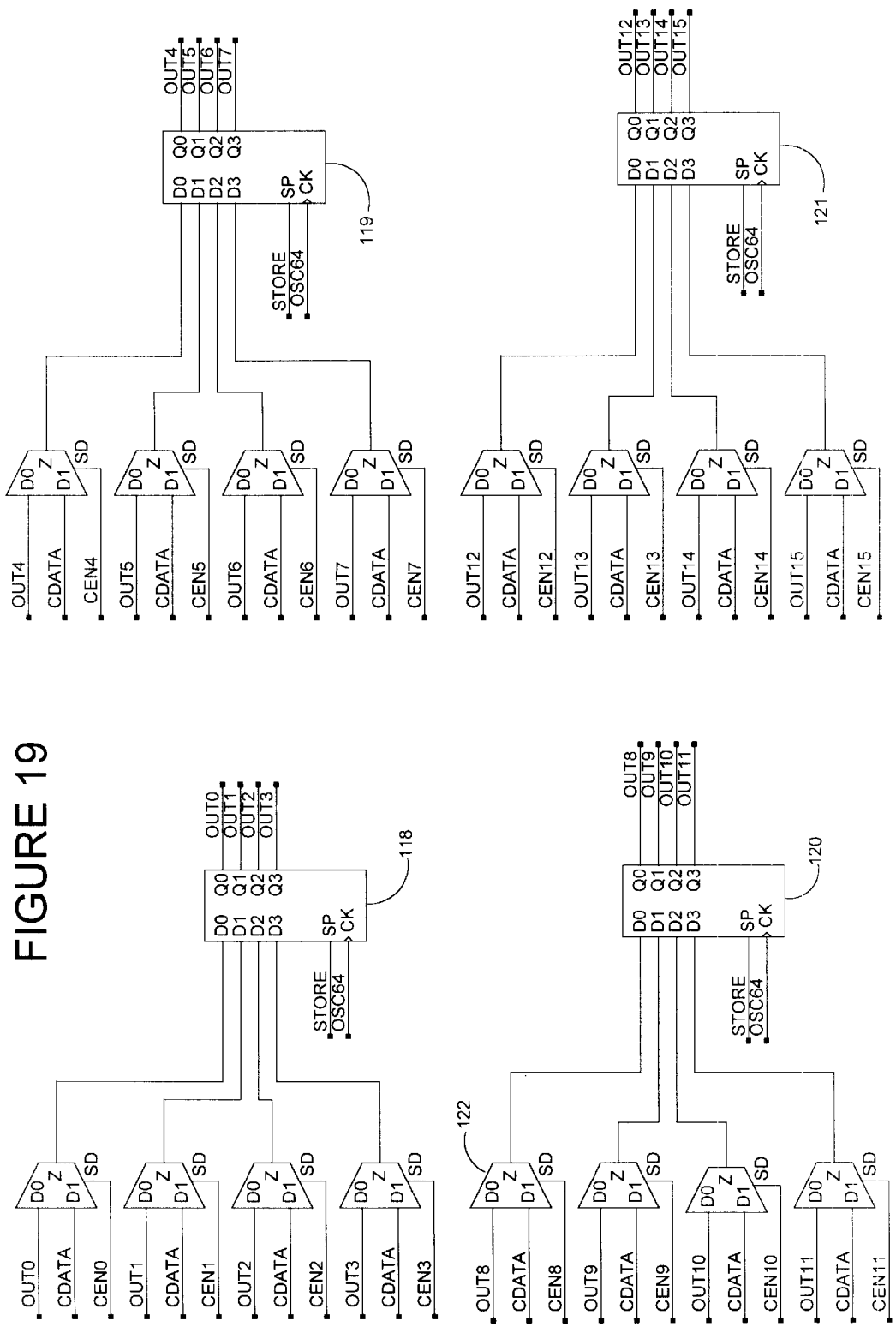

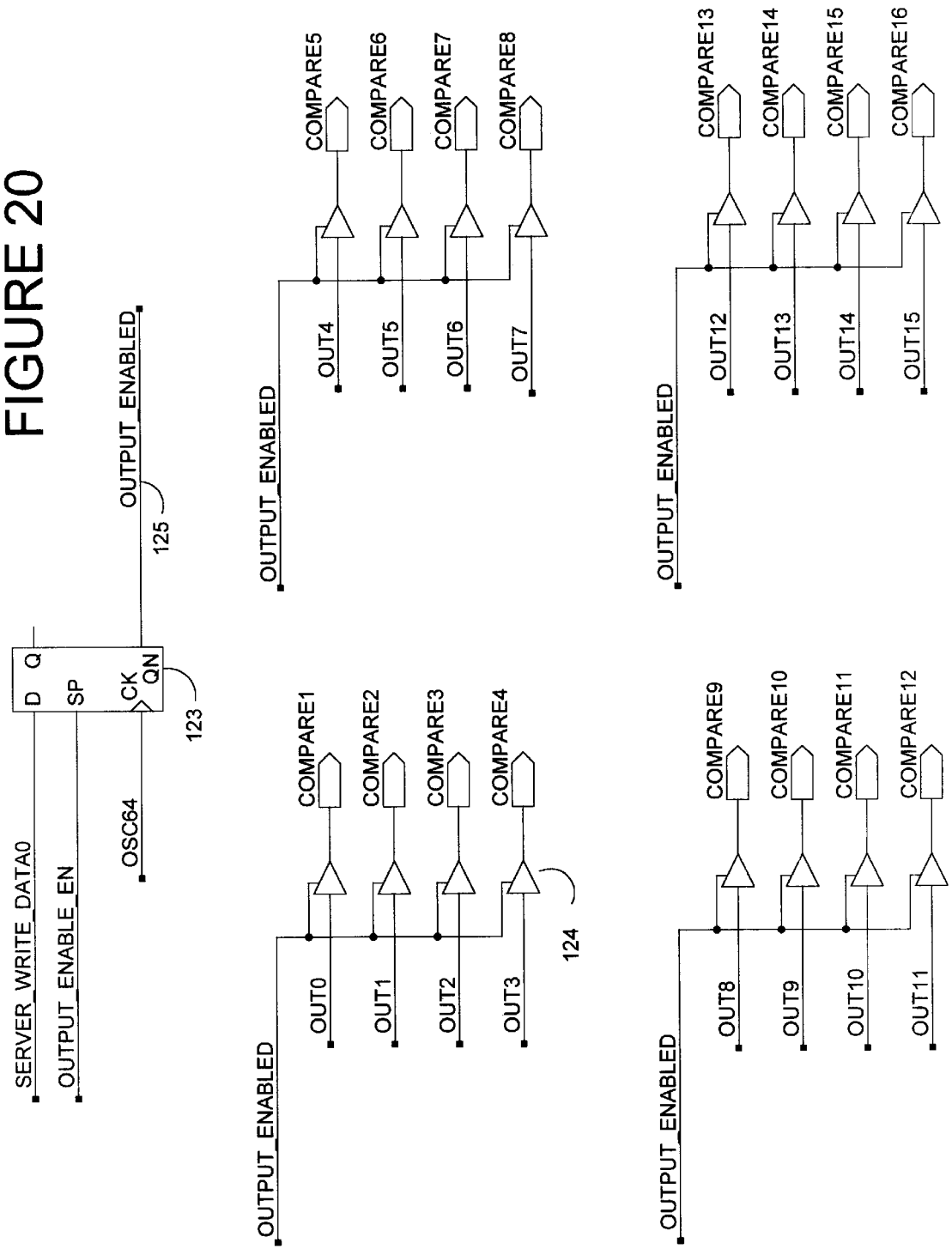

MULTIPLEXING DECODER/COUNTER CIRCUIT FOR MONITORING QUADRATURE POSITION ENCODERS

FIELD OF THE INVENTION

The present invention relates generally to Incremental Motion Control Systems and more particularly is a multiplexing electrical hardware design which monitors the positions of quadrature encoders and presents that position information to a controlling processor.

BACKGROUND OF THE INVENTION

Incremental motion control is the most common class of programmable motor control Systems. Incremental motion control includes servo motor control and stepper motor control. In both cases the position of a motor is known through the ongoing accumulation of known incremental changes in motor position.

Servo motor position is monitored through a position sensor. A common and important sensor class is the quadrature encoder. A quadrature encoder produces a pair of square waves typically noted as "A" and "B" channels, representing motor movement. A properly aligned encoder shows a 90° phase difference between the A and B channels from which the motor direction can be inferred. A common rotary encoder resolution is 500 A and B cycles per revolution. Each transition of the A and B channels can be detected to discern four times this number of incremental counts. A 500 "slit" encoder therefore produces 2000 "counts" of information for each encoder rotation.

An important part of an incremental motion controller is the electronics which monitors the quadrature encoder and reports this position information to the controlling processor. This motion control electronics is commonly called a "Quadrature Decoder". FIG. 1 shows a typical implementation of a quadrature decoder containing the following elements:

- Differential receivers 1 on encoder lines
- Digital Filters 2 to eliminate effects of electrical noise on encoder signals
- Quadrature to Up/Down conversion including x4 edge detection 3
- Up/Down signals to Cumulative Position Counter 4
- Position Counter to Position Latch 5 which keeps information stable during read Advanced motion control systems include additional functions which augment this basic operation. One function is "Position Capture" which uses a capture latch 6 to record the current motor position based on an external signal. This function is used for high-speed registration applications where the motor position must be known in relation to an external event sensed through the "C" input 7 or the "Index" pulse or "I" channel 8 on an encoder. The index pulse is a once-per-revolution signal often used in machine initialization.

An additional function is "Position Compare" which continually compares the motor position against a specified value and produces an output signal when this position is reached. Supporting these additional functions requires:

- Additional digital filters 9 for the capture input and index signals
- Additional latches 6 to retain position count when capture events occur
- Additional latches to retain compare value with comparison and output control 10

Position information is commonly represented in hardware counters having much less range than the range of the control system. The hardware range must span the distance travelled in one controller sample period. The controller links information from one sample to the next in software to create a range much greater than the range of the hardware alone. Controller sample rates of 1 millisecond to 250 microseconds are common. Hardware count ranges of 12 bits are common. A 1 millisecond controller can compare a 12 bit position register against a previous value and detect without ambiguity a change of plus or minus 2047 counts. This allows a 1 millisecond sample rate controller to monitor count rates of approximately 2 MHz, a fairly high speed for a motion system. Higher sample rates permit higher count rates.

These combined functions require approximately 100 digital flip-flops to implement. Advanced motion controllers often have 8 axes on a single card requiring as many as 800 flip-flops for this section of the control system. The common implementation is a Gate Array, which is expensive to develop and expensive to change as technology progresses.

Field Programmable Gate Arrays (FPGAs) allow a designer to create and alter hardware designs with little expense. However the per-flip-flop cost of an FPGA is currently 5 times the cost of the same function implemented in a conventional gate array for the same hardware design.

A relatively new feature of FPGA's is "Granular User Memory" available within the FPGA design. Augmenting the conventional logic and flip-flops are small blocks of memory that can be arranged into various memory structures and distributed throughout the device. The Lucent Technology "ORCA" series and Xilinx 4000 series devices are examples of devices which support distributed, granular user memory.

An ongoing trend in FPGAs has been increasing device frequency. If conventional quadrature decoding circuit design is used with modern FPGAs, count rates of up to 30 MHz are achievable. However the sensors attached to the motors seldom generate frequencies higher than 1 MHz. With a conventional design the FPGA is underutilized and the solution is overpriced.

One method that has been utilized in the prior art to improve the performance of motion control systems is found in the "Programmable Counter/Timer Device with Programmable Registers Having Programmable Functions", of Morinaga, et al., U.S. Pat. No. 5,089,955. This device uses a plurality of registers that are capable of various functions as directed by microcode instructions. The instructions are cyclically scanned to successively read out register operations, thereby enabling the device to perform an ongoing pattern of calculations and register transactions. One shortcoming of this device is that there is only one register bus. Therefore operations cannot be performed simultaneously, but must be performed in sequence. Another related shortcoming of this device is that the CPU must manipulate the "write" and "read" buffers on an axis-by-axis basis. Accordingly, there is no means of obtaining a single current readout of the position of all axes, but rather the position sensing is a continually staggered operation.

Accordingly, it is an object of the present invention to provide a means to monitor quadrature encoder positions in an incremental motion control system.

It is a further object of the present invention to provide quadrature decoder support for multiple motors (i.e. 16).

It is a still further object of the present invention to provide this support by means of a single quadrature decoder and novel multiplexing techniques so as to rapidly share the decoder among 16 channels. This allows the present invention to avoid replicating the hardware used in the prior art 16 times to control 16 motors.

It is yet another object of the present invention to provide "shadow memory" which allows position data from all controlled axes to be copied into buffers that can be taken out of the active control loop so that current information from all axes is available simultaneously.

SUMMARY OF THE INVENTION

The present invention is a quadrature decoder support system for multiple motors. An overview of the system is shown in FIG. 2. The system comprises an edge detector, a position counter, a position latch, a capture latch, and compare management means. A chief difference between the present invention and the prior art is that register elements utilized in the prior art are replaced with addressable memory blocks throughout the design of the present invention. For example, a 12 bit register in the prior art device is replaced by a 12 bit wide by 16 word deep memory block which holds 16 separate pieces of information. Within the FPGA device this is an even exchange. That is, the memory block, even though holding 16 times as much information, requires no more resources than the conventional register in an FPGA.

Information from external differential receivers is directed into a single quadrature decoder circuit using a switch with an effective 16 to 1 selection. An axis scanning state machine addresses multiple memory block based data storage locations simultaneously. Scanning is performed in a circuitous manner in conjunction with the switch. The circular loop frequency for the sequence is chosen to be equal to or greater than the maximum encoder frequency required.

At each visitation of any particular memory address, the state of the circuit is reestablished from the last visit by loading the previously stored state from memory. Any change in quadrature signals is noted, and any up or down count is accumulated to the position counter. This information is then stored back into memory and the system moves to the next memory location. The compare management information goes through a steering switch into a series of non-multiplexed compare latches to sustain hardware outputs even when a particular memory address is not being selected.

Each memory location in the control system corresponds to an independent motor. The number of motors supported by the system therefore becomes the depth required for the memory blocks. Memory blocks that are 16 words deep are available in current FPGAs allowing the approach of the present invention to support 16 motors using a single FPGA.

Instead of having position counters for each axis, there is only one counter which is rapidly shared among multiple axes. Instead of having 64 separate digital filters (4 per axis) for a system with 16 axes, there are fewer filters which are rapidly shared inside the switch.

The high speed performance of modern FPGAs is traded off, through this multiplexing technique, to axis breadth allowing increased axis count. An FPGA that can only support 2 or 3 motors using a conventional design can support 16 motors using this memory-block design. This causes the price-per-axis for an FPGA approach to drop below the standard gate-array approach. As well, this "circular-sequencing" can be extended outside the device to the encoder differential receivers in order to reduce by a factor of 4 the total PC board traces and FPGA device pads required to monitor the positions of 16 motors.

An advantage of the present invention is that it allows an FPGA that would normally support monitoring the positions of only two or three motors to monitor the positions of 16 motors.

Another advantage of the present invention is that it reduces the per-axis cost of the quadrature decoder system.

A still further advantage of the present invention is that it reduces the hardware required for the control system.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 19 illustrates the processing of the CENXX signals.

FIG. 20 is the output enable control.

DETAILED DESCRIPTION OF THE INVENTION

Figure 1:
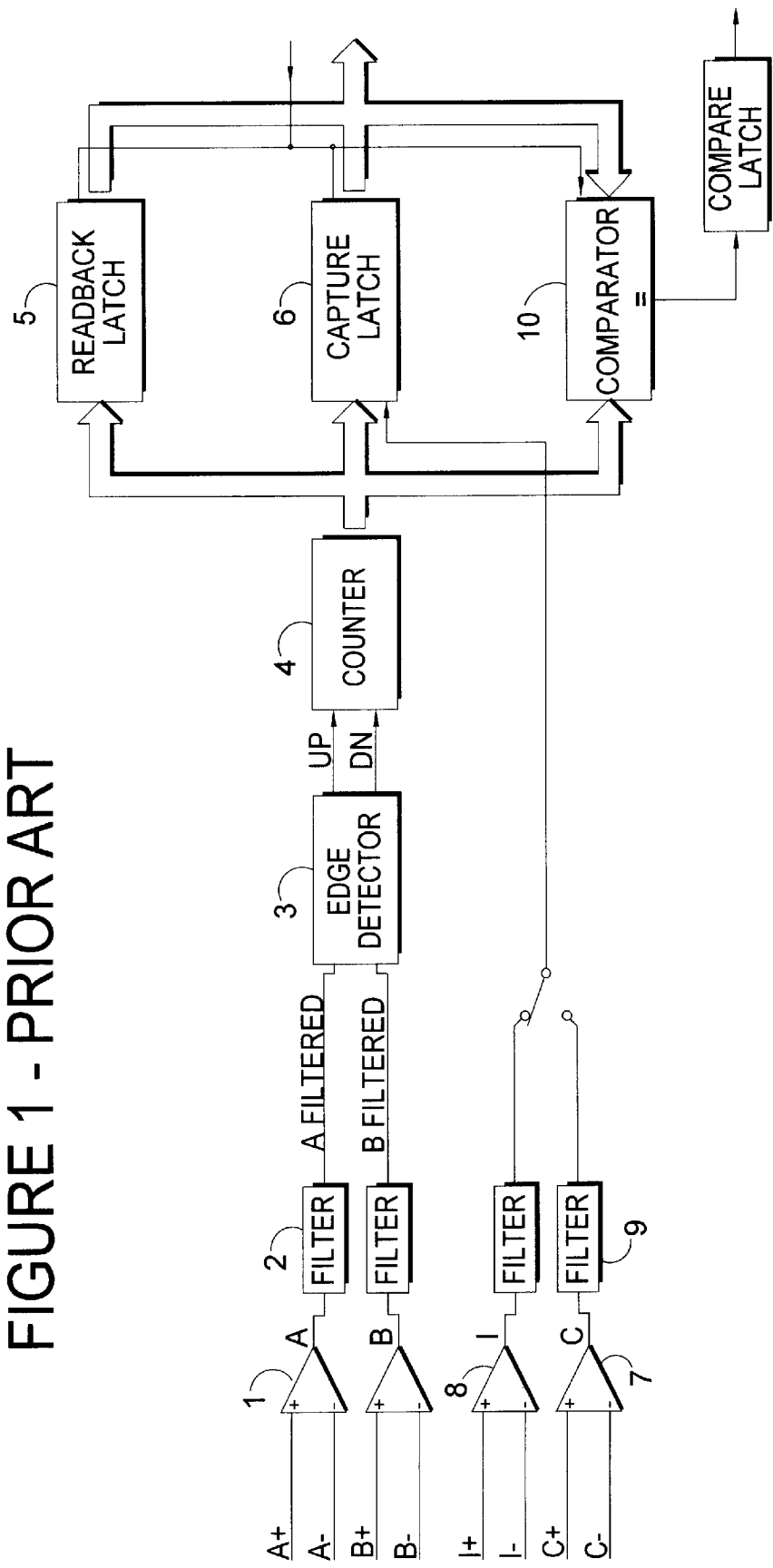
FIG. 1 is a schematic diagram of a prior art quadrature decoder.
Figure 2:
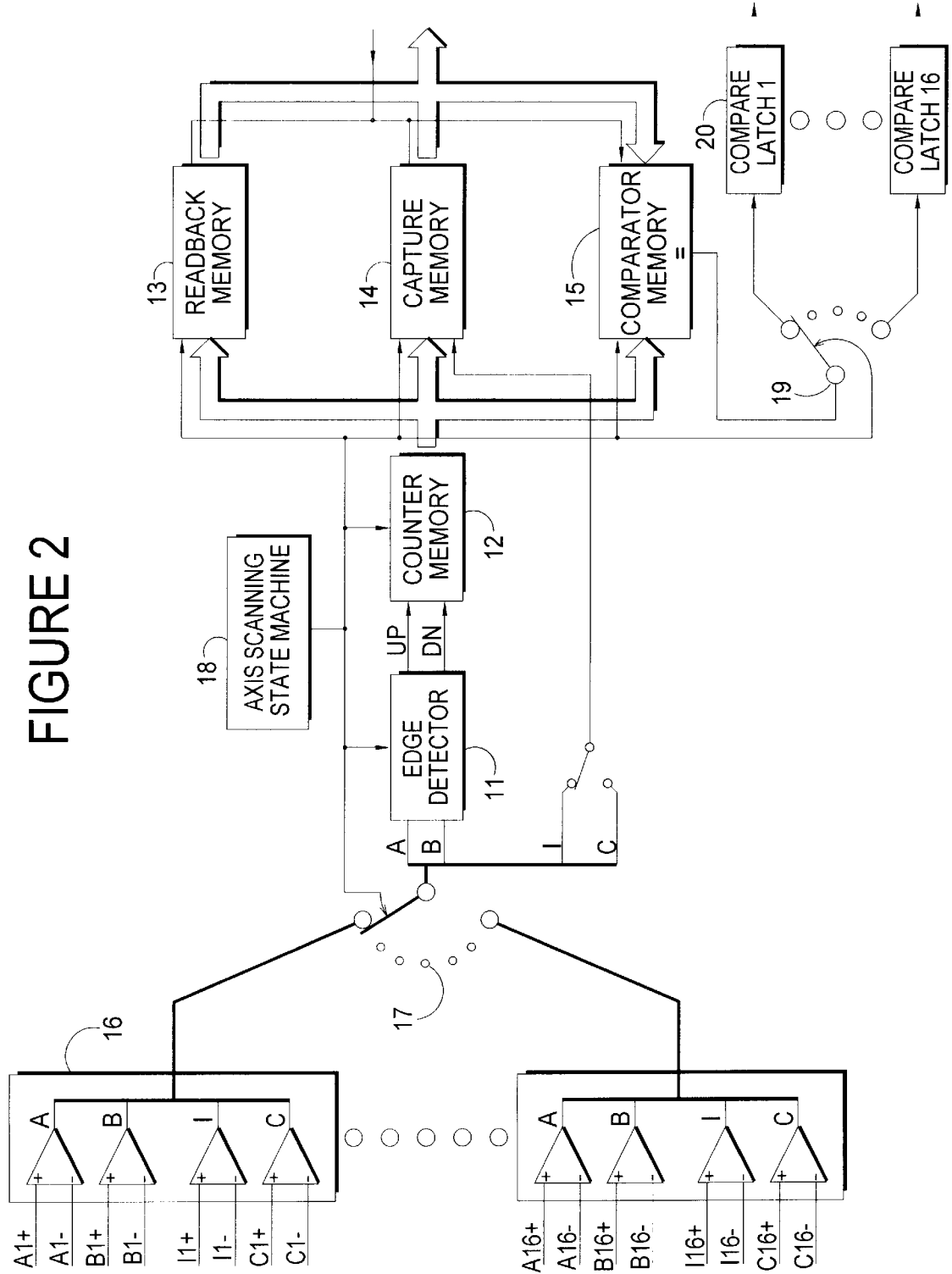
FIG. 2 is a schematic diagram of the quadrature decoder of the present invention.

The present invention is a quadrature decoder support system for multiple motors. A schematic overview of the system is shown in FIG. 2. The system comprises an edge detector 11, a position counter 12, a position readback 13, capture 14, and compare management means 15. Where prior art devices utilize register elements, the present invention uses addressable memory blocks. For example, a 12 bit register is replaced by a 12 bit wide by 16 word deep memory block which holds 16 separate pieces of information. Within the FPGA device this is an even exchange. That is, the memory block, even though holding 16 times as much information, requires no more resources than a conventional register in an FPGA.

Information from external differential receivers 16 is directed into the single quadrature decoder circuit using a switch 17 with an effective 16 to 1 selection. An axis scanning state machine 18 addresses multiple memory block based functions simultaneously. Scanning is performed in a circular manner in conjunction with the switch 17. The total circular loop frequency for the scanning sequence is chosen to be greater than or equal to the maximum encoder frequency required.

At each visitation of any particular memory address, the state of the circuit is reestablished from the last visit by loading the previously stored state from memory. Any change in quadrature signals is noted, and any up or down count is accumulated to the position counter. This information is then stored back into memory and the system moves to the next memory location. The compare management information goes through a steering switch 19 into a series of non-multiplexed compare latches 20 to sustain hardware outputs even when a particular axis is not being selected.

Each memory location corresponds to an independent motor. The number of motors supported then becomes the depth of the memory blocks. In the preferred embodiment, the depth of the memory blocks is 16, inasmuch as 16 word deep memory blocks are readily available in current art FPGAS. This allows the system of the present invention to support 16 motors in a single FPGA. Instead of having position counters for each axis, there is only one counter 12 which is rapidly shared among 16 axis. Instead of having 64 separate digital filters for a 16 axis system (4 per axis) there are fewer filters which are rapidly shared inside the switch 17.

Figure 3:
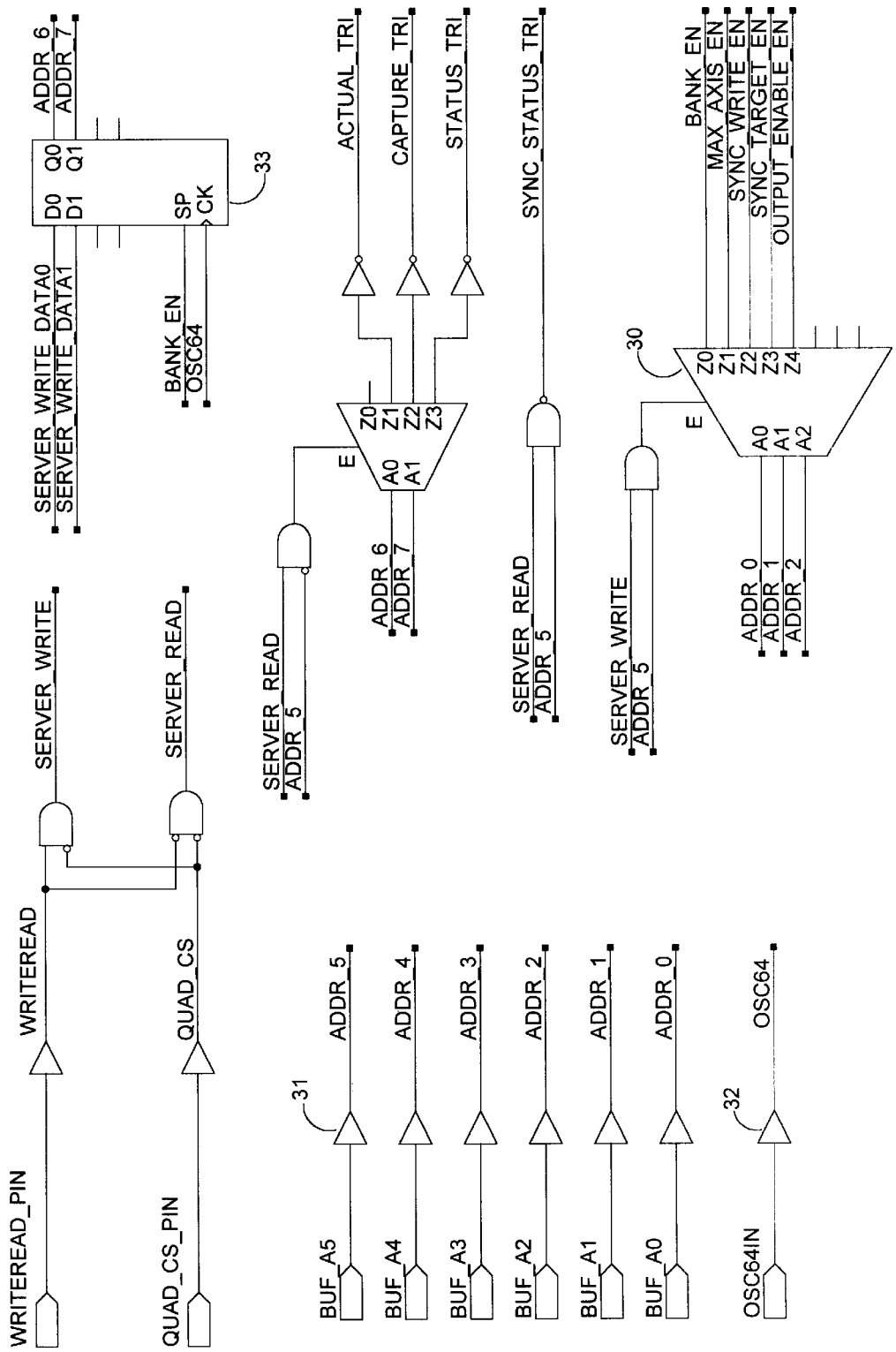
FIG. 3 illustrates a microprocessor interface circuit.

The circuitry of the various blocks of the control system of the present invention is detailed in FIGS. 3–20. FIG. 3 depicts the microprocessor interface circuits of the preferred embodiment. The interface circuits comprise chip select generation means 30, address buffers 31, and a clock buffer 32. The device generates a plurality of address lines, ADDR_6 and ADDR_7 using a latch 33 in order to provide additional address space for the system.

Figure 4:
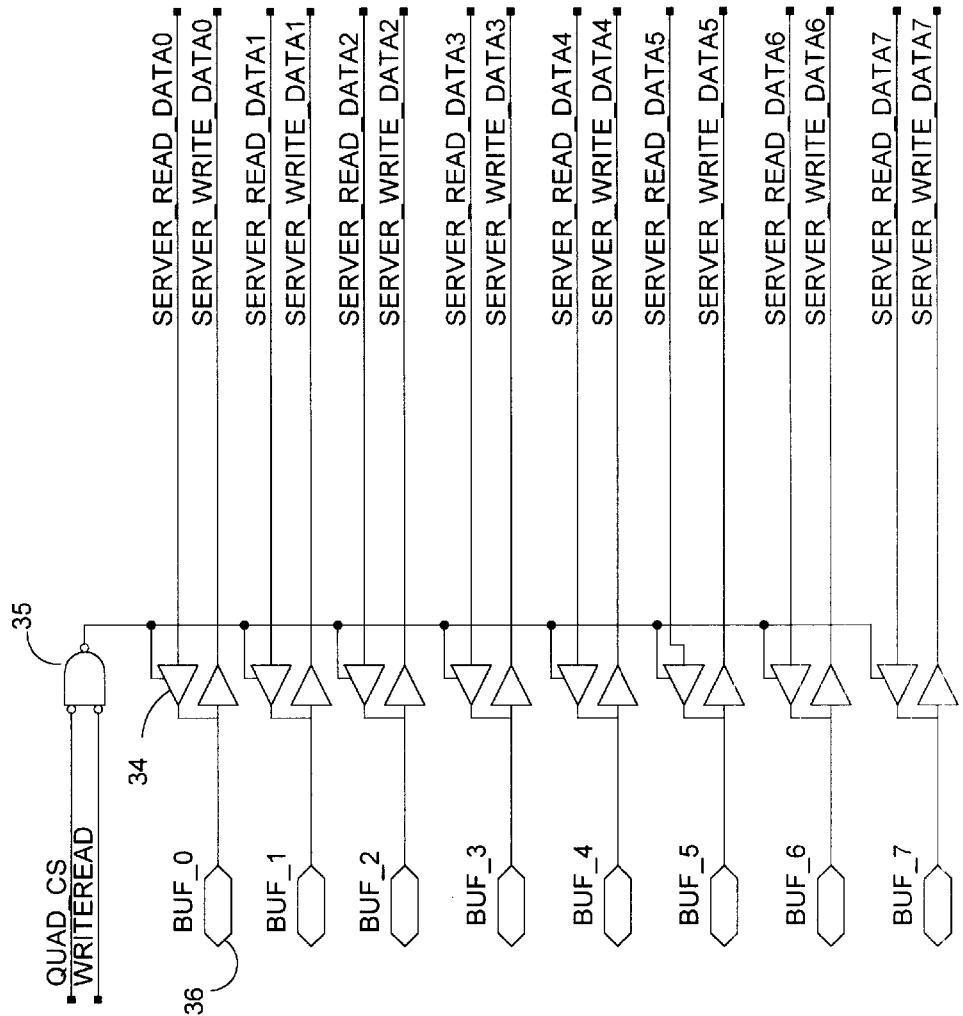
FIG. 4 illustrates an FPGA data bus circuit.

FIG. 4 depicts the preferred method of providing bidirectional data flow into and out of the FPGA. Bi-directional drivers 34 are directed by a read event to the FPGA through a logic gate 35 to drive information onto external device pads 36.

Figure 5:
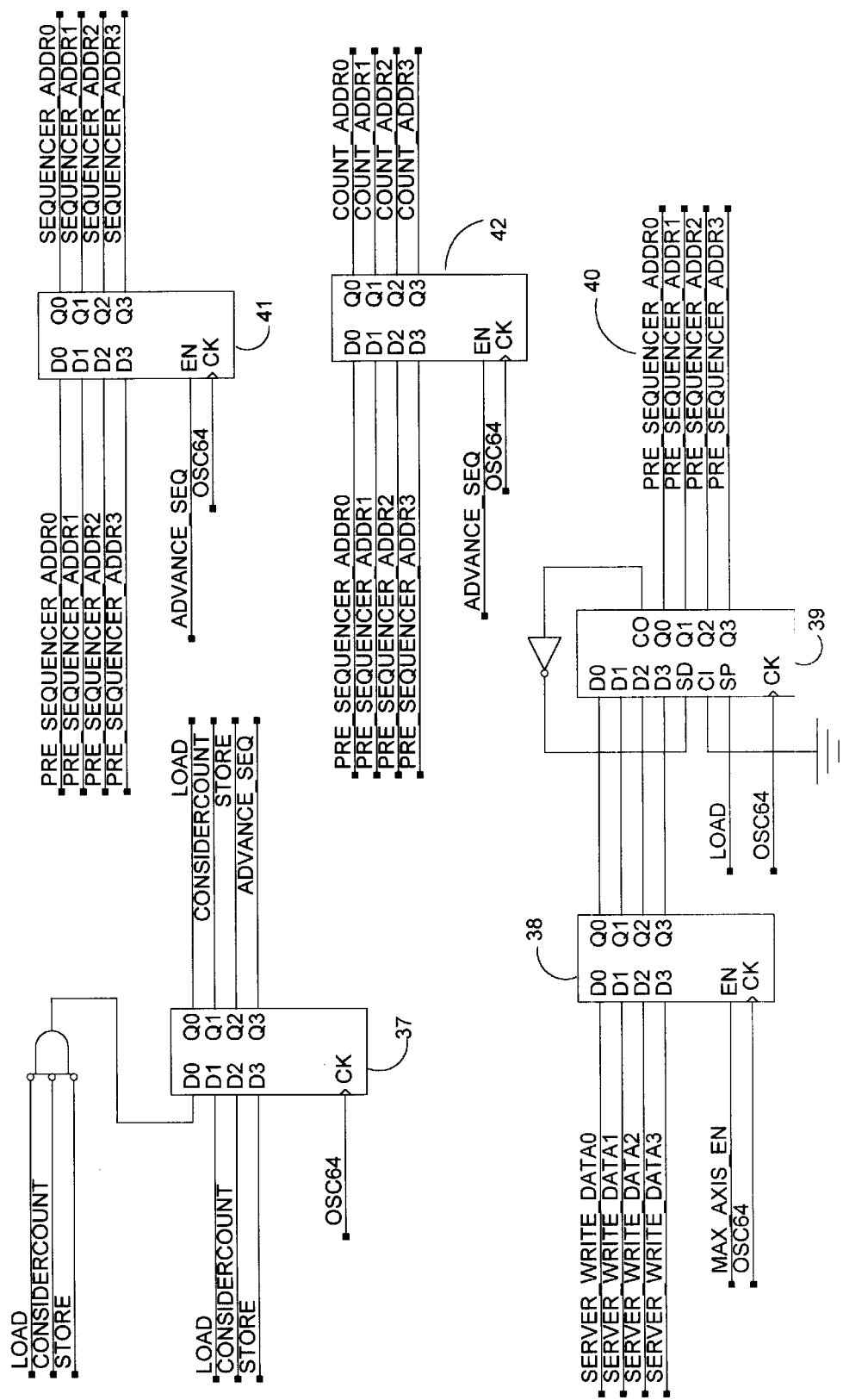
FIG. 5 shows the circuitry of the axis scanning state machine.

FIG. 5 illustrates the axis scanning state machine. The axis scanning state machine includes a "one hot" memory cycle state machine 37 which generates a cycling pattern of load, consider count, store, and advance states. The state machine 37 is driven by the system clock which in the preferred embodiment operates at 64 MHz. This state machine drives the fundamental pattern of memory management in the control system.

The number of axes being visited in the system is determined by the numeric setting in latch 38. Following each full cycle of the state machine 37, the axis selection counter 39 decrements by one, so that the system scans the next axis in sequence. When counter 39 reaches 0, the system resets it to the axis value specified in latch 38. This "pre-sequencer" information is distributed to two latches, 41 and 42. There are two latches 41 and 42 so as to replicate the axis channel information in different locations inside the FPGA and reduce transit time for the information to various destinations in order to improve timing. Accordingly, over the range of axes stored in latch 38, each axis is visited during a cycle. During each visit, the axis experiences load, consider count, store, and advance events.

In several instances it is necessary to write configuration information and data into memory structures which are continually active in the load-count-store-advance cycle. It is not an option for the microprocessor to control the address or data lines of the memory structure directly to perform the write because this would disrupt the device's ability to participate in the ongoing cycle. A "synchronous writer" is described following which stages data ahead of a memory structure and then performs a write operation into the memory at a safe and non-disruptive opportune time.

Figure 6:
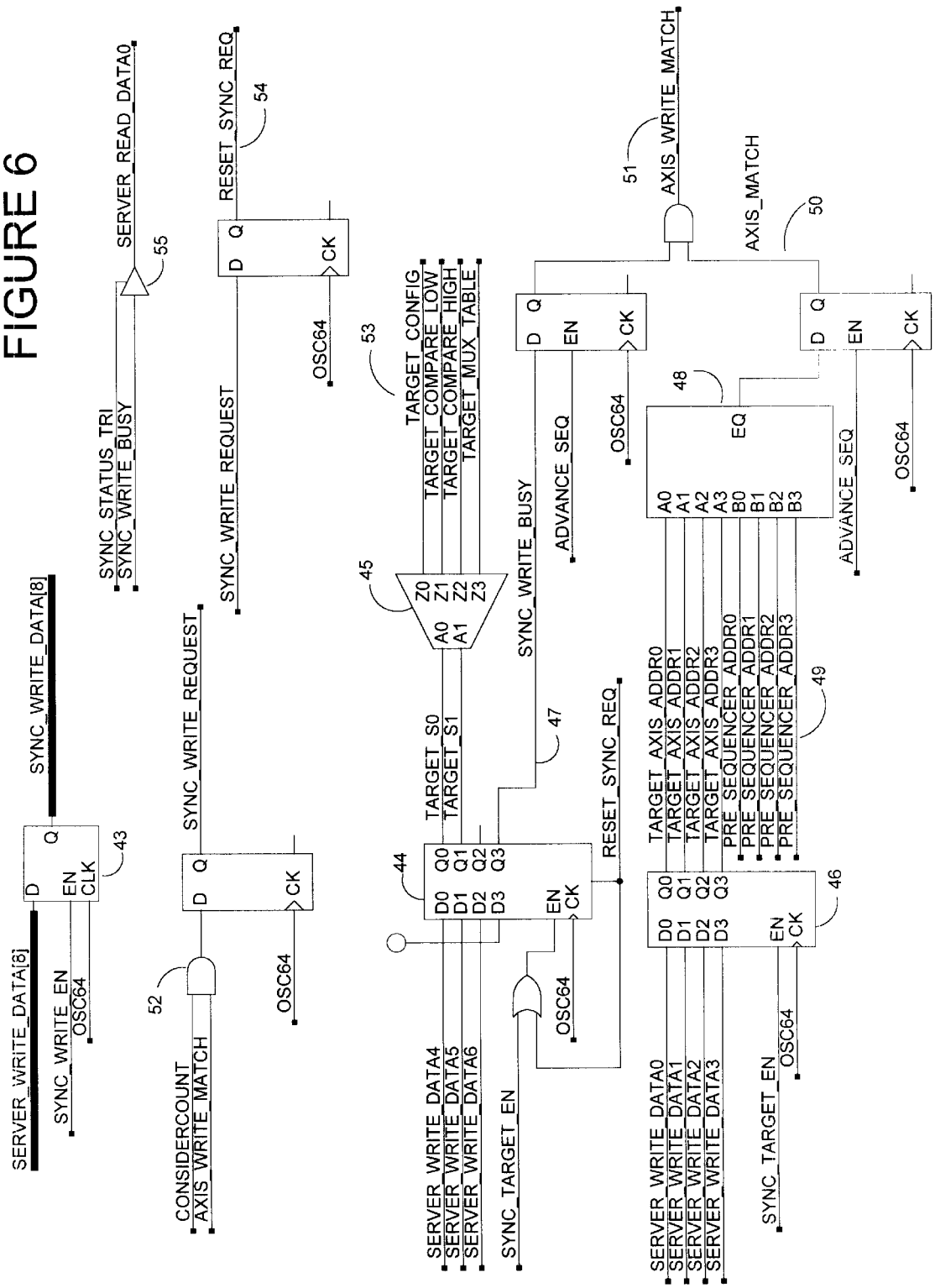
FIG. 6 shows the portion of the circuitry that controls the writing of data to a desired target.

The synchronous writer is shown in FIG. 6. Data to be written is stored in a conventional data register 43 and is provided on a bus labeled SYNC_WRITE_DATA, an 8 bit bus. An information target register 44 and subsequent demultiplexer 45 are used to identify one of four possible targets for the information on SYNC_WRITE_DATA. Destinations include configuration, compare position data, and the multiplexer table driving the external device selects. The number of the axis to receive the information is stored in an axis target register 46. A pending write event is indicated by SYNC_WRITE_BUSY 47 which goes high after the information target register 44 has been written.

A comparator 48 continually compares successive axis addresses, expressed through PRE_SEQUENCER_ADDR 49, against the axis number stored in the target axis latch 46. When the two are the same, AXIS_MATCH 50 becomes true leading to AXIS_WRITE_MATCH 51 being true after synchronizing the signals. The signal is then combined with CONSIDERCOUNT through an and gate 52 to create the signal SYNC_WRITE_REQUEST during the store cycle. The destination memory structure, as decoded by target signals 53, then performs the write during this safe period in the cycle. The signal is reset on the next cycle through RESET_SYNC_REQ 54. The level of SYNC_WRITE_BUSY can be read through a tristate buffer 55 so that the microprocessor waits for the current write operation to complete before requesting another. In general, writing to the QUAD device is not time critical.

Figure 7:
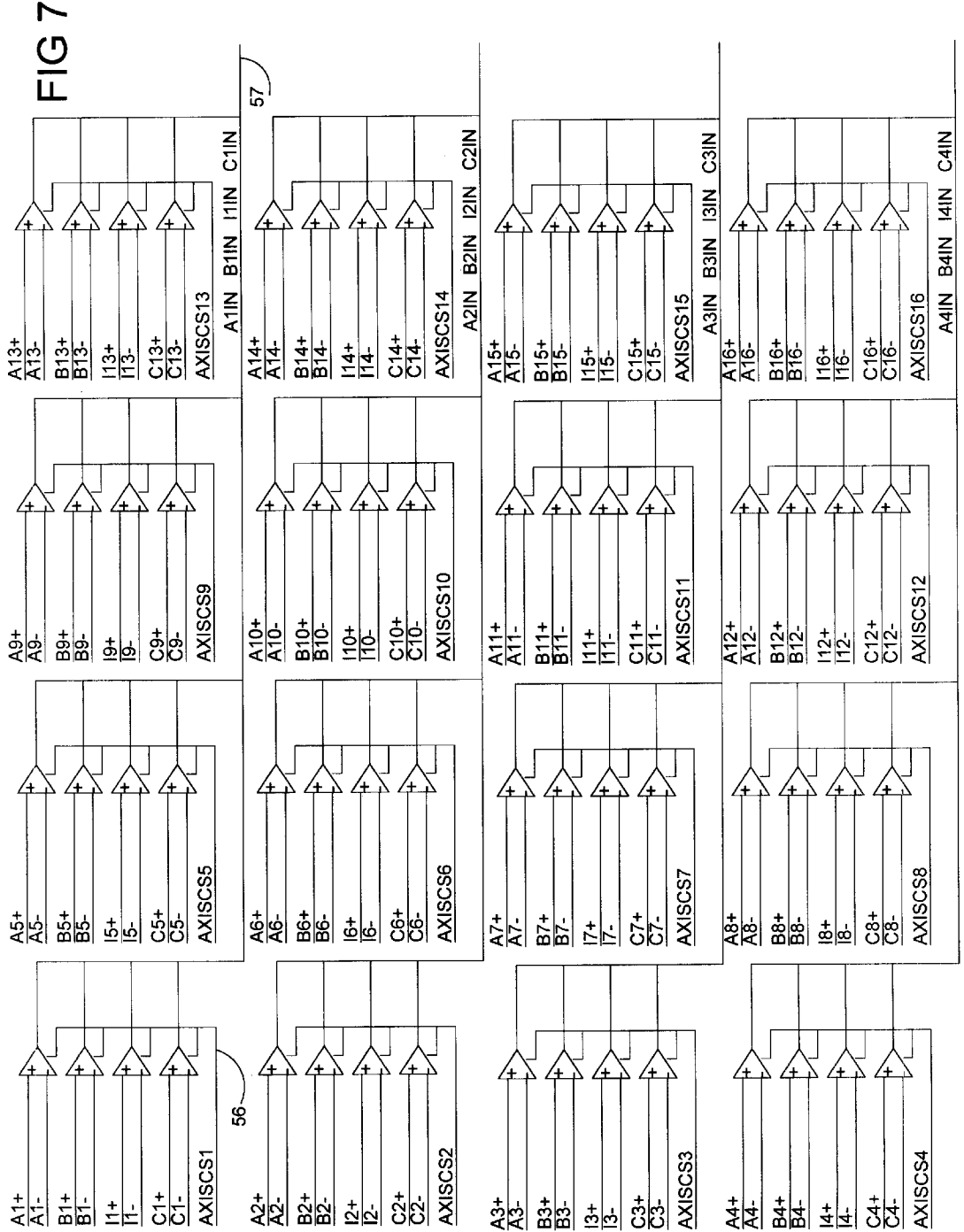
FIG. 7 illustrates an array of tristate differential receivers.

FIG. 7 shows an array of tristate differential receivers. Each axis uses four receivers for signals A, B, I (index) and C (capture). Each group of four is enabled with a signal such as AXISCS1 56. Directing axis information into the quadrature decoder is done in two separate 4-to-1 reductions. The first 4-to-1 reduction is done external to the FPGA using these differential receivers. The sixteen receivers are arranged into four groups. Within a group, all of the receivers for a particular signal, i.e. the A signal, are tied together and share a common wire. The signal level is determined by which of the differential receiver enables is active. On any single group bus there should only be one active driver for the signal. Bus 57 is an example of one bus group.

Figure 8:
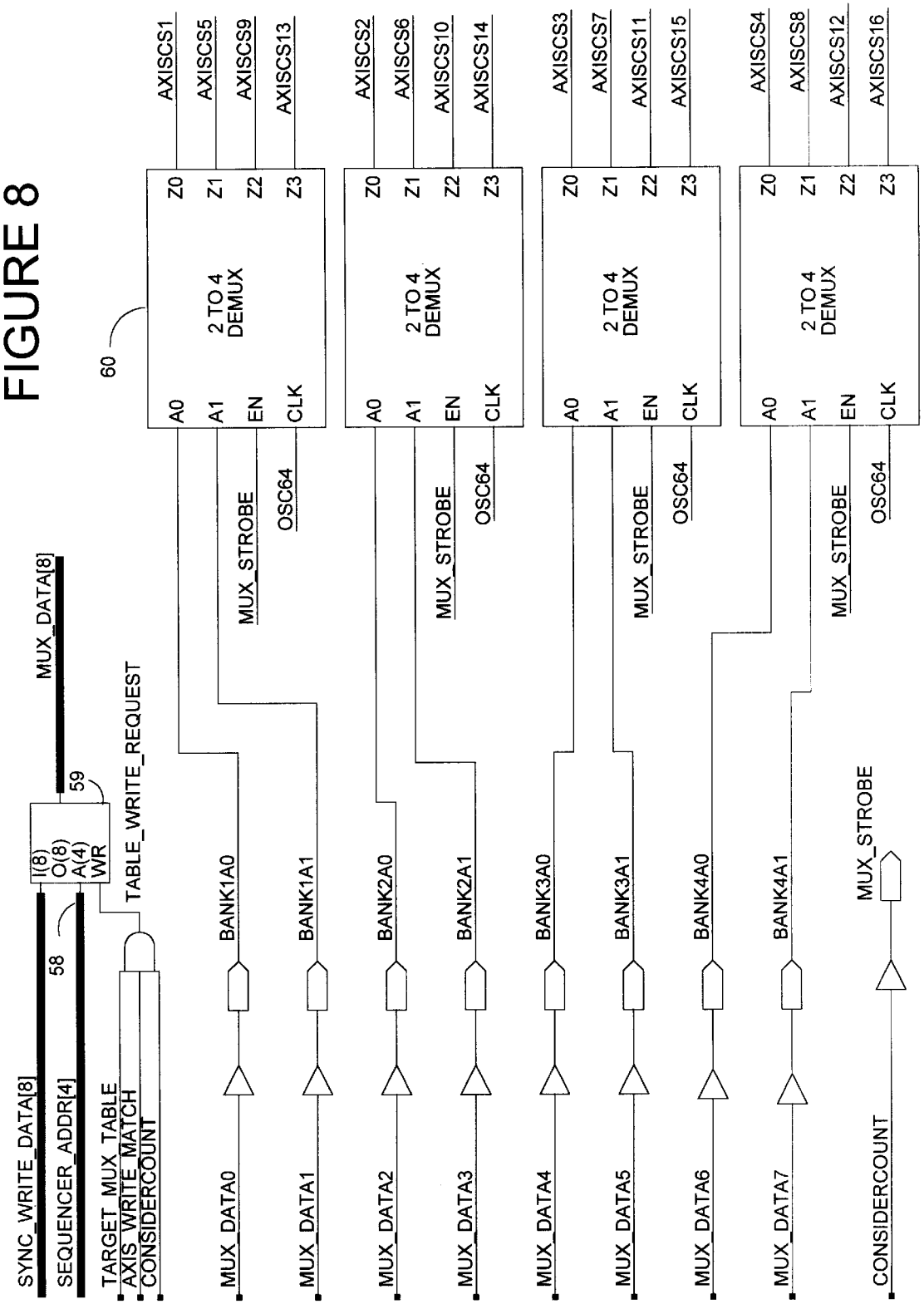
FIG. 8 demonstrates how the external tristate signals are selected.

FIG. 8 shows how external tristate signals are selected. SEQUENCER_ADDR 58 (sequencer address) is a 4 bit address bus distributed throughout the control system. The sequencer address 58 indicates which axis is currently being observed. This address drives a lookup table 59 which latches and presents the lookup table results in demultiplexing latches 60 which are external to the FPGA. The information in the lookup table is "phase adjusted" so as to maximize settling and filter time for the information coming through the tristate buffer.

The sequencer address 58 does not have to iterate over all 16 possible axes but can be configured to iterate over 4, 8, 12, or 16 axes. By iterating over fewer axes, each axis has a higher "visitation frequency" and therefore a higher maximum count frequency. The content of the lookup table is based on the number of axes being serviced, as anticipating the "next" axis is important for optimum phase adjustment. The lookup table is a synchronous writer destination. Information is placed into the lookup table 59 through the synchronous writer described above with reference to FIG. 6.

Figure 9:
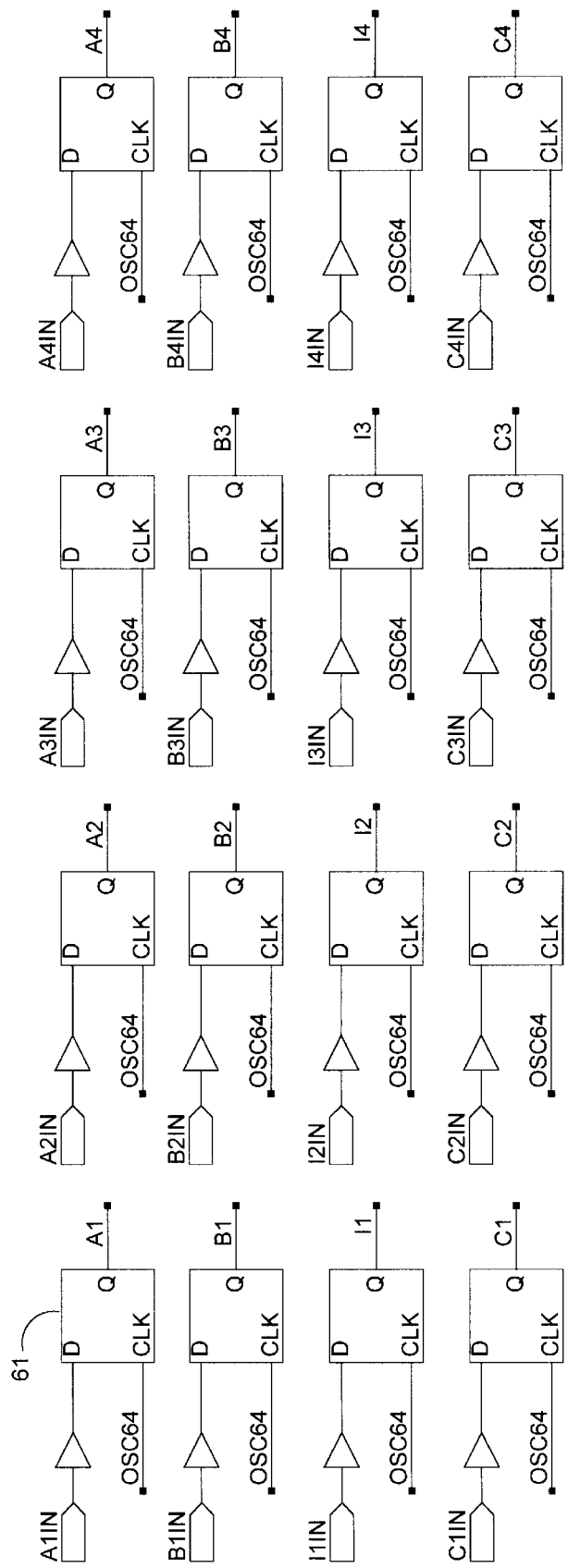
FIG. 9 shows the filtering of the signals received from the differential receiver buses.

FIG. 9 shows signals coming from the differential receiver buses and going into 3-bit digital filters 61 to reduce noise. In the preferred embodiment, four separate banks, each containing four signals, are shown. Each bank contains A, B, and I channels coming from the quadrature sensors, and a "C" channel, for "Capture Input". The C channel is used for high speed registration.

Figure 10:
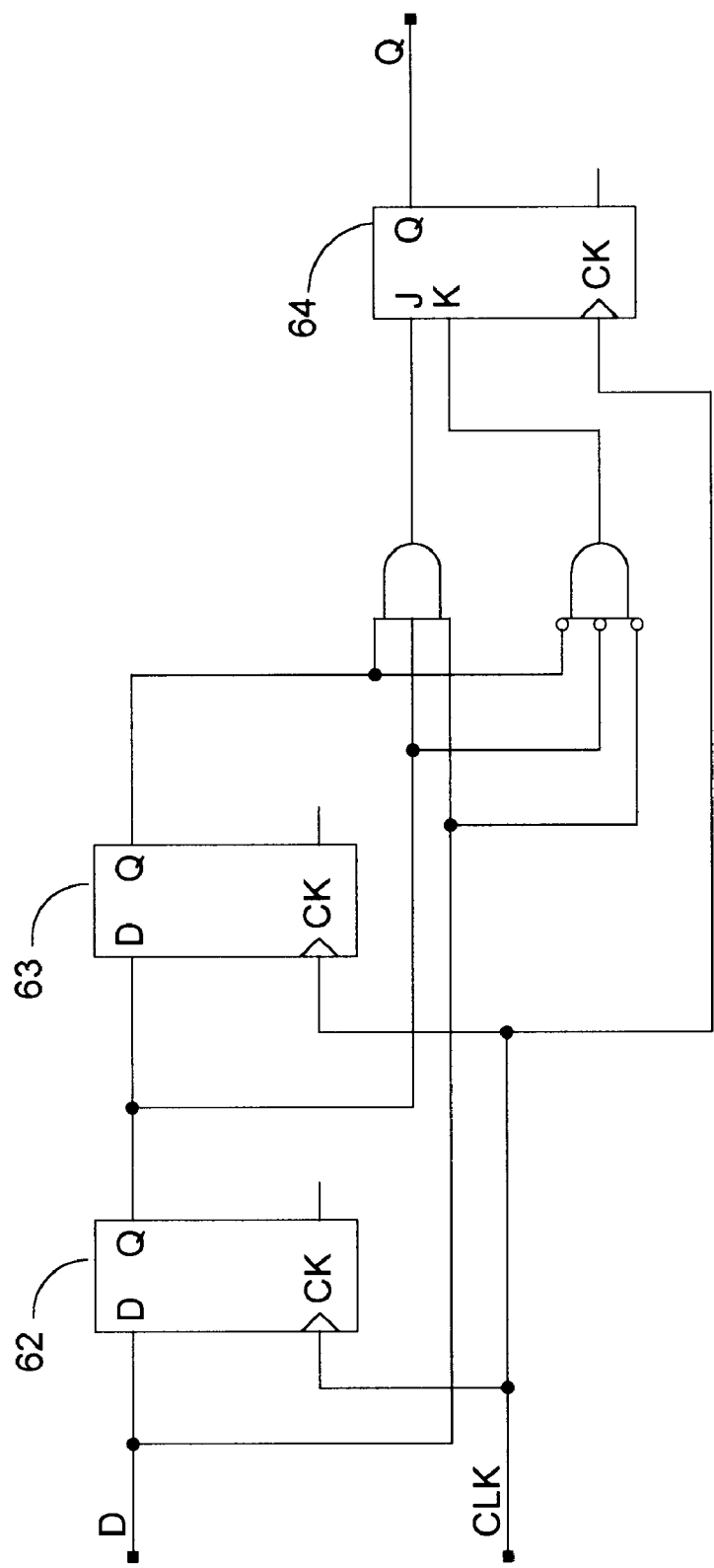
FIG. 10 is a detailed diagram of a digital filter.

FIG. 10 shows the detail of the digital filter used in the preferred embodiment. This construction is known in the art. As well as the current value of the signal, latches 62 and 63 record the two previous clocked values of the signal. The output latch 64 will be set to high or low only if the signal has had a consistent value for three consecutive clocks. If the signal has not had a constant value for three consecutive clocks, the latch remains unchanged and waits for more stable data.

Figure 11:
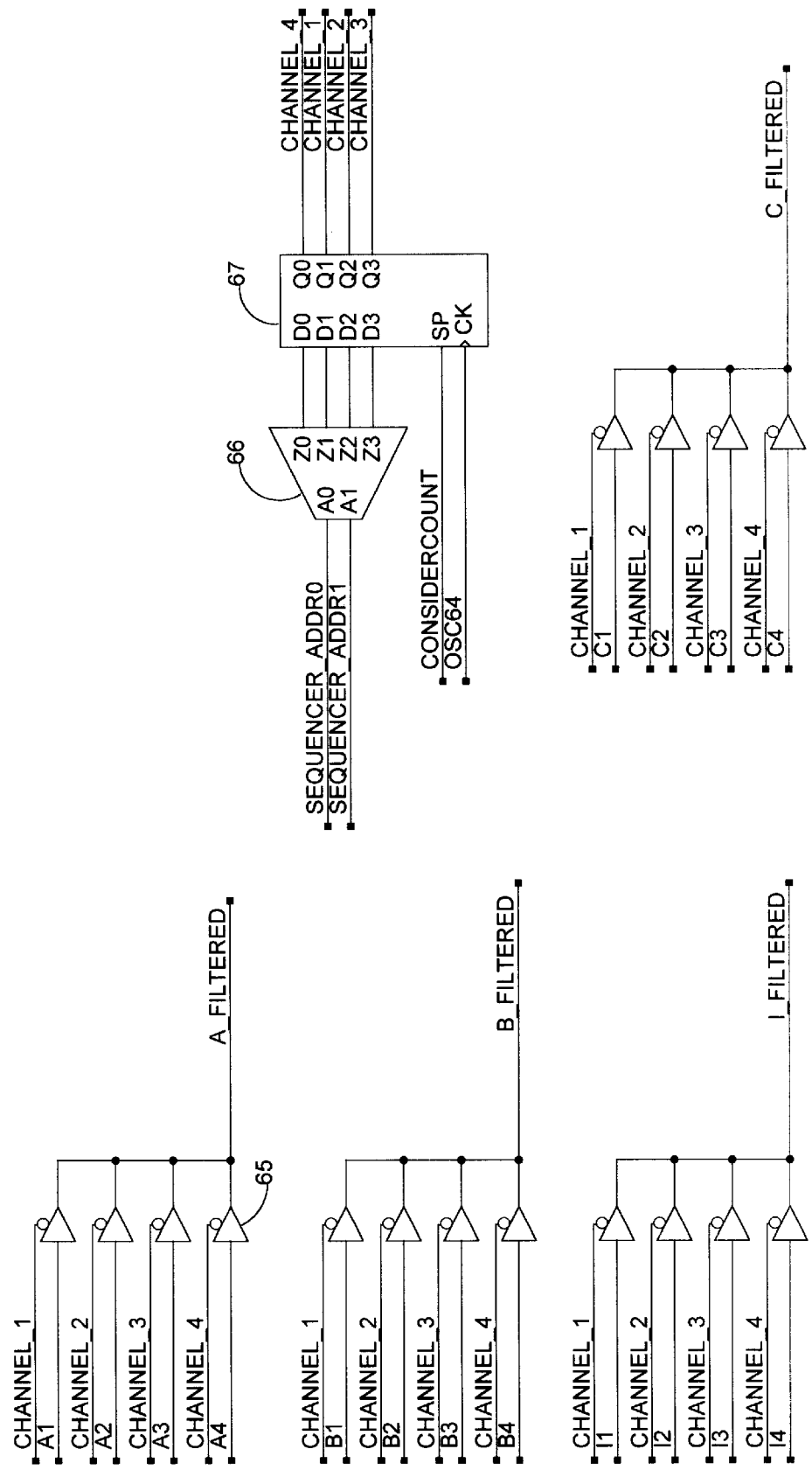
FIG. 11 demonstrates channel selection in the present invention.

FIG. 11 illustrates the operation of the channel selectors. The inputs from the outside signals A1, B1, I1, C1, A2, B2, I2, C2, A3, B3, I3, C3, and A4, B4, I4, C4 are processed through another 4-to-1 selector 65 to emerge as A_FILTERED, B_FILTERED, I_FILTERED and C_FILTERED. The selected channel is determined by the demux 66 and latch 67. Note that a sequencer value of 0 selects channel 4 rather than channel 1. The offset nature of the channel selection accomplishes optimal channel phase adjustment on the internal switch in a similar manner to the lookup table performing optimal phase adjustments on the external differential receivers. The net effect with both external and internal switching is 16 to 1 sensor selection. By having digital filters in between the switches additional time is provided for sensor information to stabilize while still sharing the filters and reducing required hardware in the quadrature decoder device.

Figure 12:
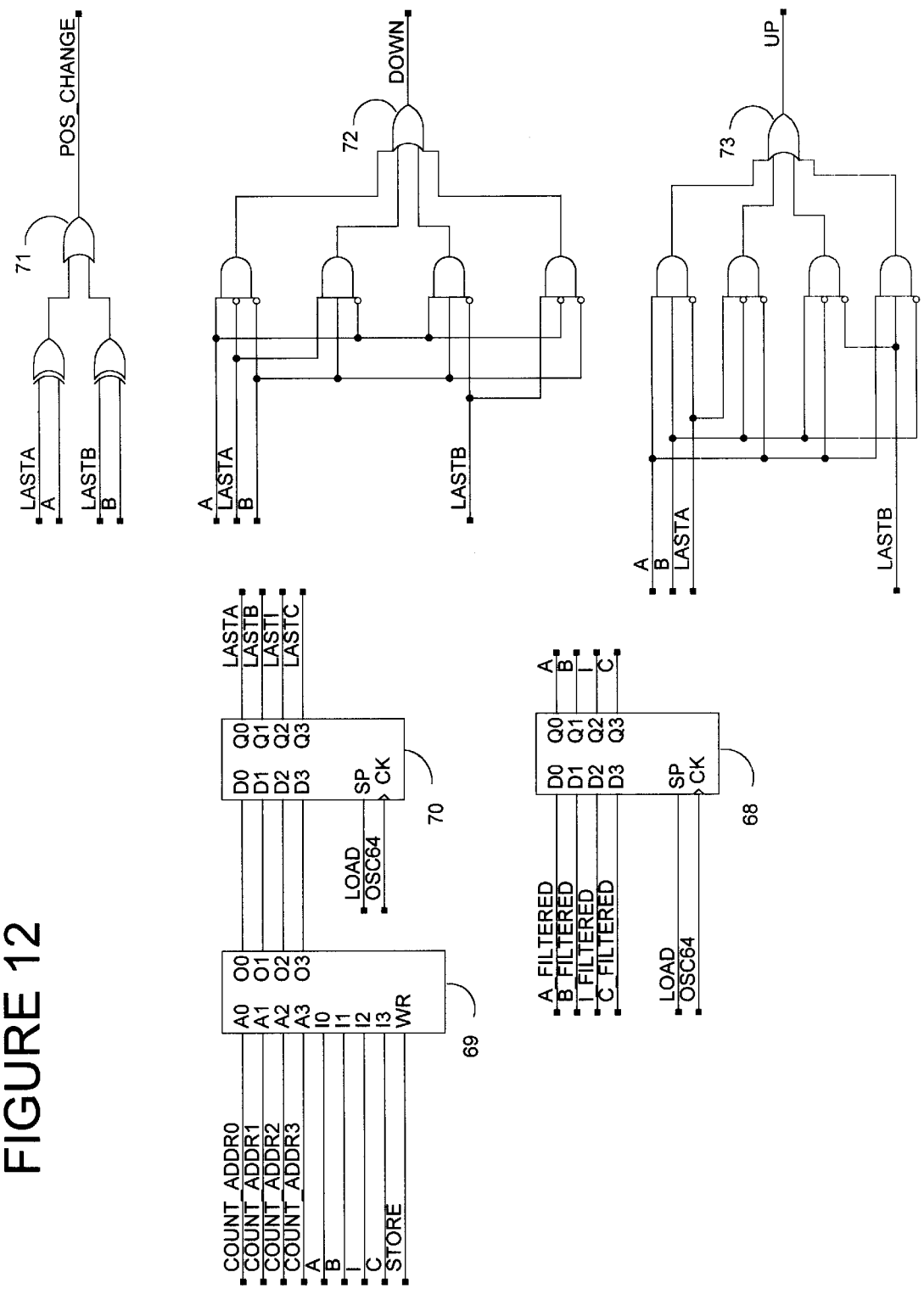
FIG. 12 illustrates how edge detection is performed.

FIG. 12 illustrates how edge detection is performed. Latch 68 records the values of the filtered signals for the selected axis. The 4 bit wide, 16 deep memory block 69 contains the values of the signals retained during the previous scanning of the subject axis and latches the values from the prior scan in latch 70. Combinational logic 71 identifies if any signal change has occurred. Combinational logic 72 identifies if a down edge change occurred. Combinational logic 73 identifies if an up change occurred. The signal values stored in latch 68 are written into memory block 69 during the store event to preserve the current state for examination on the next visit to this axis.

Figure 13:
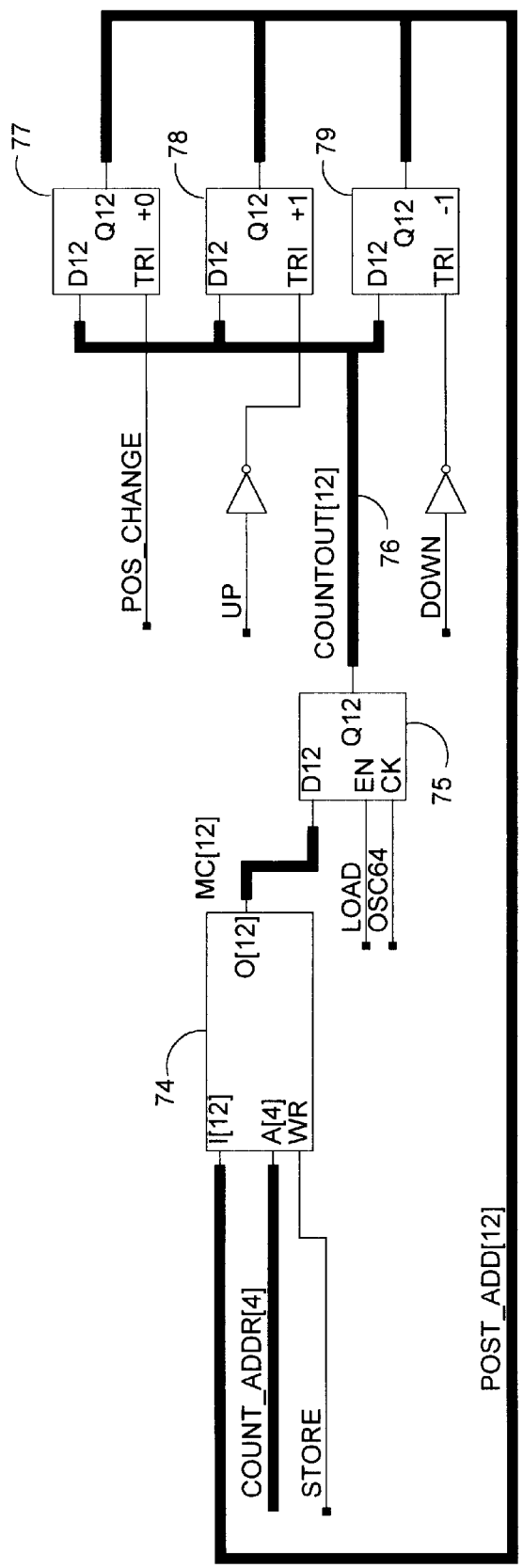
FIG. 13 is the multiplexing position counter.

FIG. 13 illustrates the multiplexing position counter, which is a key element of the present invention. The heavy line represents a 12 bit data bus. The current position of the sensors is maintained in memory 74, a 12 bit wide, 16 word deep memory structure. The system continually cycles through load, count, store, and advance operations.

During load, the current value of the selected address is stored in the 12 bit latch 75. The UP, DOWN, and POS_CHANGE signals from FIG. 12 drive the three calculation blocks 77, 78, and 79. The calculation blocks 77, 78, and 79 take COUNTOUT 76, a 12 bit value, as input. Block 77 is a pass-through tristate buffer which produces as output either a tristate value or the value of COUNTOUT. Block 78 calculates the value of COUNTOUT+1 with its tristate control driven by UP. Block 79 calculates COUNTOUT−1, and is driven by DOWN. These calculations are performed as soon as COUNTOUT is valid, before the UP and DOWN values have been determined. This approach of calculating all of the outcomes early, and then selecting the proper answer, UP, DOWN, or no change, at the last moment, allows for a higher loop frequency and improved speed performance. Once UP, DOWN, or no POS_CHANGE has been identified, the appropriate block is made active (only one of the three blocks is ever active at any given time) and the new value is written back into position memory 74 on the store cycle. The ADVANCE_SEQ cycle then changes addresses to the next value for the next axis and the cycle repeats.

Although position information for up to 16 axes is stored and is current in the position memory structure 74, it is not possible to directly read this memory in a typical microprocessor-interface manner. Count information must be stable and unchanging for the microprocessor to perform a multi-byte read. Any interruption of the load-count-store-advance cycle would cause encoder information to be lost. To be able to read the information, a separate memory structure must be introduced.

Figure 14:
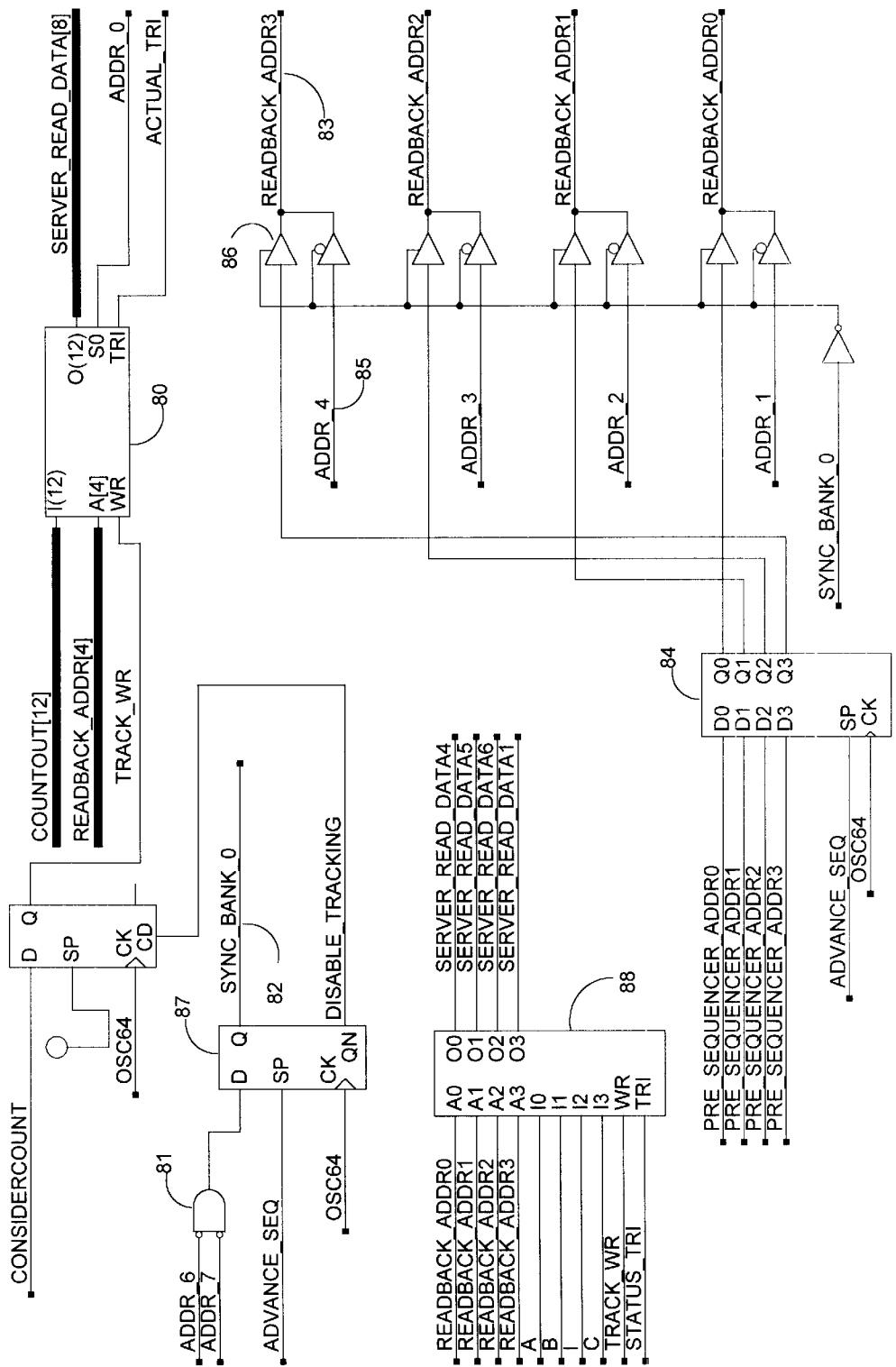
FIG. 14 shows the readback memory block.

FIG. 14 shows the readback memory block 80, which is also a 12 bit by 16 word structure. The readback memory 80 enables the device to safely read the information in memory 74. Readback memory 80 "shadows" the information in the position memory block 74, but can be taken "off-line" from the load-count-store-advance cycle and manipulated through the microprocessor so that the position information can be read. This "switchover" is accomplished when the microprocessor selects "BANK_0" in Server Decoding, a state representing ADDR6=0 and ADDR7=0 and calculated by gate 81. This condition becomes SYNC_BANK_0 82 because of latch 87 which causes the switchover to occur during a safe transition in the load-count-store-advance cycle. When readback memory 80 is switched over due to SYNC_BANK_0, memory write activity is inhibited allowing memory contents to be stable. The readback memory address lines 83 switch from being driven by the load-count-store-advance sequencer latch 84 to address lines relating to the microprocessor interface 85 through 2-to-1 switches 86. The memory can then be read at will by the microprocessor while position memory 74 continues maintaining count values uninterrupted. When the microprocessor is finished reading the memory, readback memory 80 is placed "on-line" and again collects information from the position memory 74 by "listening in" to the write operations that load position memory 74. An additional readback memory block 88 is provided to record and return the status of low level signals A, B, I, and C for diagnostic purposes or as general purpose inputs.

Figure 15:
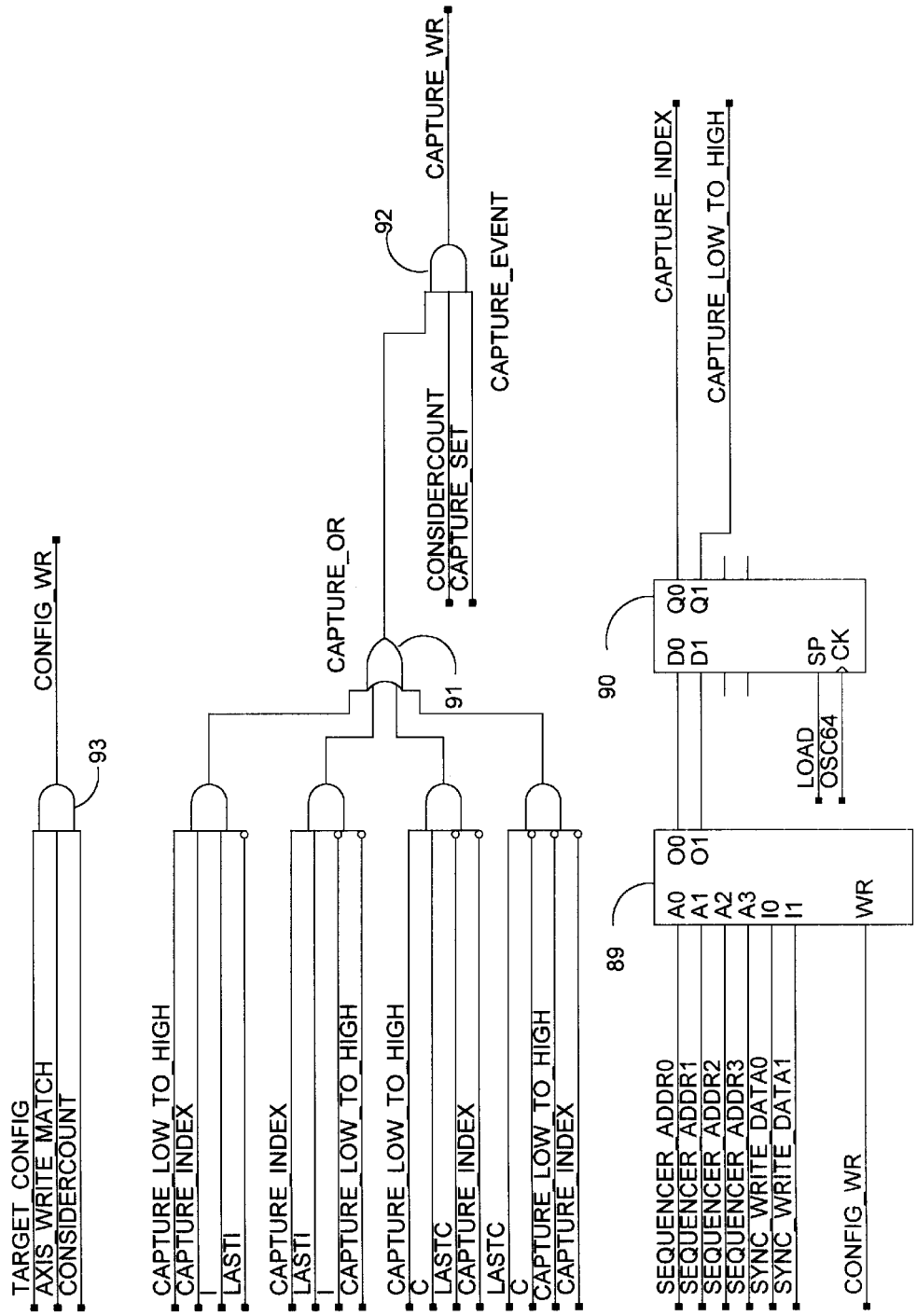
FIG. 15 is the position capture circuitry.

FIG. 15 illustrates the circuitry for the position capture. Position capture is the activity of recording the current position counter when an external signal event occurs. Events supported include an index signal, normally from the third or index channel of an optical encoder, or an application specific capture input such as a photo sensor. Position capture activities include arming or preparing for capture, configuring a capture signal source and sense to either trip on a rising edge or trip on a falling edge, recording position when the input event occurs, providing status that the event has occurred, and providing the information to the microprocessor in such a way that other events can be captured for other axes during the read operations of an earlier capture.

As shown in FIG. 15, the position capture configuration is stored in a 2 bit wide, 16 deep memory block 89. Position capture memory block 89 indicates the source of the capture signal and the high/low sense of an active capture event. Capture configuration memory, like position memory, is a continually cycling memory structure participating in the load-count-store-advance cycle. Information must be written into the memory without interrupting the load-count-store-advance cycle. This is accomplished through the synchronous writer. Configuration memory becomes a synchronous writer target through combinational logic 93.

The armed condition of an axis position capture is recorded in latch 90. This memory structure remembers if an axis is currently armed. Arming information and configuration information flows through combinational logic 91 to become the CAPTURE_WR signal 92.

Figure 16:
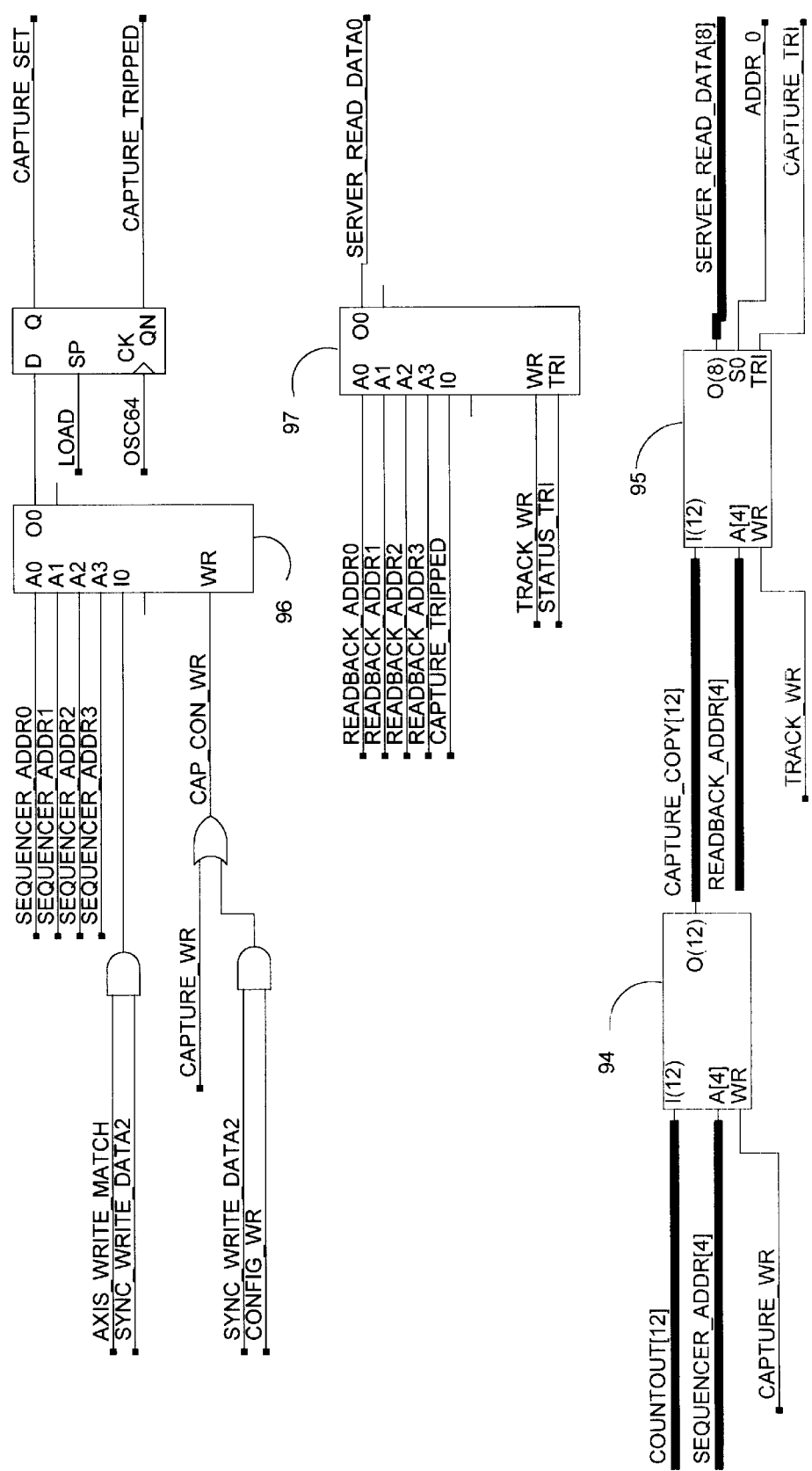
FIG. 16 shows the position capture memory.

FIG. 16 describes the capture memory. The CAPTURE_WR signal 92 causes the current position of the currently selected axis to be stored into capture memory 94. Capture memory is another 12 by 16 memory structure. Capture memory 94 retains the axis position when the capture event occurs. However, the microprocessor cannot directly read capture memory 94 because capture memory 94 must remain available to record a possible capture on another axis which has yet to trip. In the same manner as readback memory 80 shadows the information in the position memory block 74 to read back position information as described above, an additional shadow memory structure 95 follows capture memory 94. Shadow memory 95 has the same shadow character as position readback memory 80. Capture memory 94 normally tracks information while it is in an on-line condition. Shadow memory 95 is taken off-line, i.e. out of the load-count-store-advance states cycle, to enable access by the microprocessor without the risk of lost data.

Whether capture has tripped or not is recorded in the capture tripped memory structure 96, a 2 bit wide by 16 deep structure. The value of CAPTURE_TRIPPED is also shadowed for "off-line" microprocessor access in the capture tripped shadow memory 97, a 2 bit wide by 16 deep structure.

Figure 17:
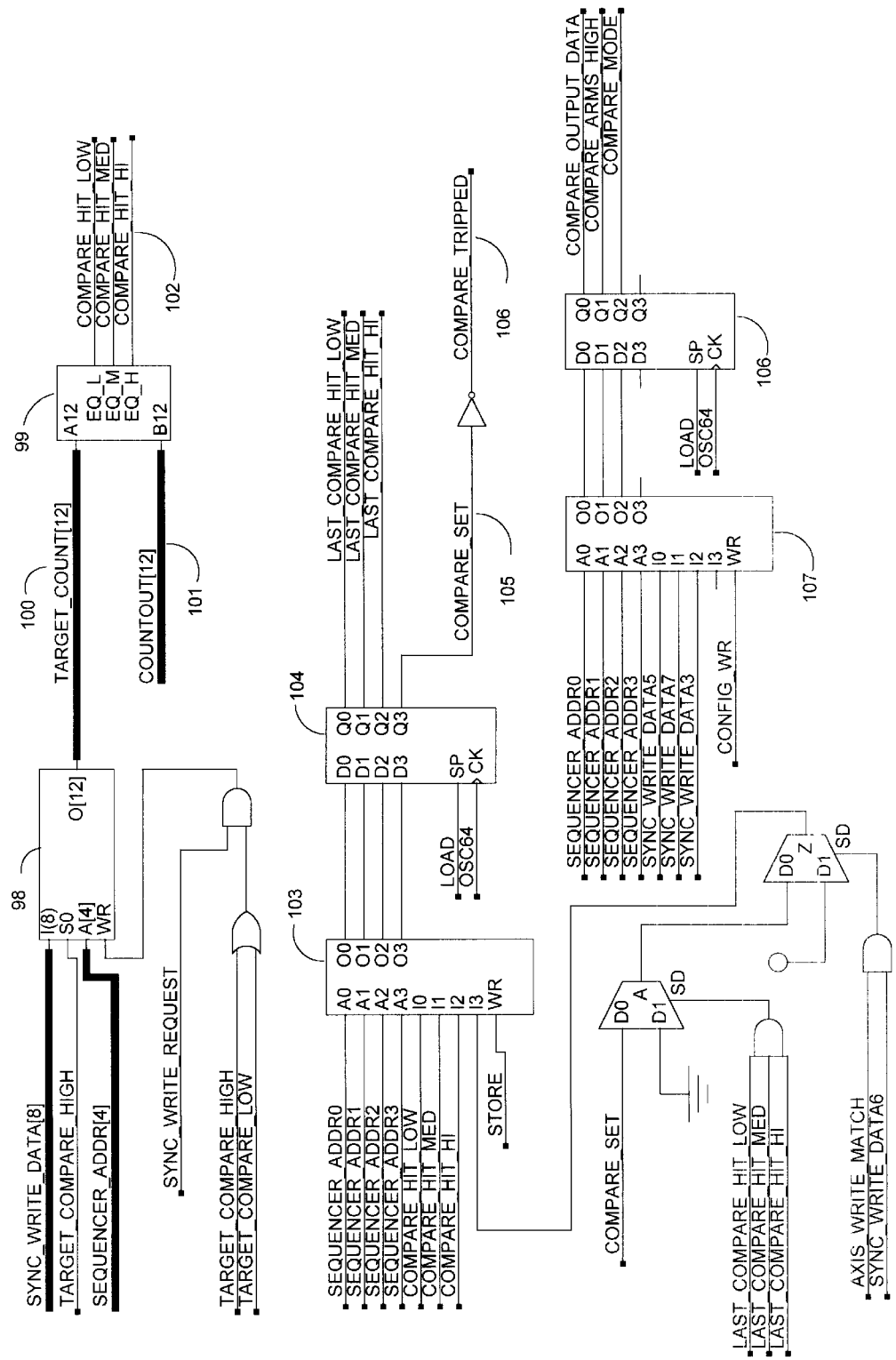
FIG. 17 illustrates the position compare manager.

FIG. 17 describes the position compare manager. The compare manager compares the current position of an axis against an expected value. When the two are the same, an external signal is set. This feature is used to provide highly-coordinated output signals in relation to machine motion. An axis not configured for this compare feature can use its compare signal as a general purpose output bit.

A position value for comparison is stored in compare memory 98. This 12 by 16 memory structure has an 8-bit interface and is filled through multiple write operations performed by the synchronous writer. The comparator block 99 performs three separate 4-bit comparisons between the two 12 bit quantities, TARGET_COUNT 100 and COUNTOUT 101, the current position of the current axis. This partial comparison is presented as COMPARE_HIT_LOW, COMPARE_HIT_MED and COMPARE_HIT_HI signals 102. The comparison is maintained as a partial comparison and evaluated during the following cycle to resolve the timing problem that is created by attempting to make a complete comparison in one cycle.

The COMPARE_HIT_HI, COMPARE_HIT_MED, and COMPARE_HIT_LOW signals 102 are stored in compare state memory 103, a 4 by 16 memory structure. On the next visitation for this axis, these values will be shown as LAST_COMPARE_HIT_HI, LAST_COMPARE_HIT_MED and LAST_COMPARE_HIT_LOW after being latched in latch 104. These signals are combined in an AND gate to determine whether a complete position compare has occurred. If so, the fourth data bit in the compare state memory structure is set to 0. The value may be set to 1 by the synchronous writer to initially arm the compare. This value is then stored and presented on the next cycle as the signal COMPARE_SET 105 and its inversion, COMPARE_TRIPPED 106. This implementation causes a worst-case delay of one microsecond between the compare event and the output, but is required due to timing constraints in the comparison function. Advances in FPGA comparators should allow even this small delay to be removed in the future.

Compare configuration is stored in compare configuration memory 107, and is latched in 108. This configuration information determines how the compare operation arms, if the bit is under compare control or user control, and the user value.

Figure 18:
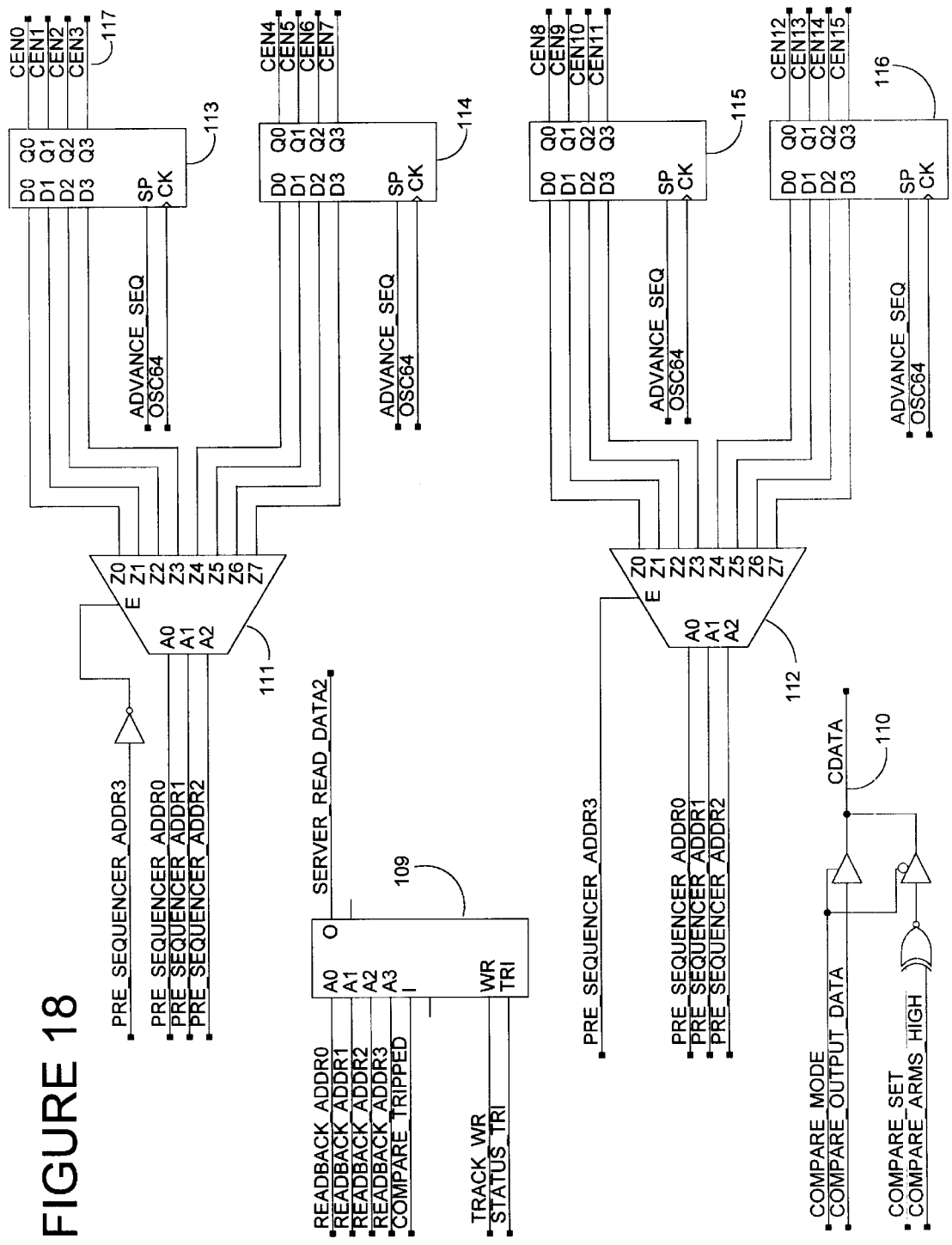
FIG. 18 shows the compare latch control.

FIG. 18 shows further compare management functions, specifically the compare latch control. The microprocessor is able to learn if the compare event has occurred by reading the shadow-style memory structure compare state shadow 109, which tracks the value of COMPARE_TRIPPED and can be taken "off-line" for reading by the microprocessor.

The CDATA signal 1 10 will be used to establish the compare output value. Based on the configuration bit COMPARE_MODE, the data is either COMPARE_OUTPUT_DATA, (when used as a general purpose output) or the value of COMPARE_SET manipulated by COMPARE_ARMS_HIGH through an XOR gate to establish a user-defined high or low level.

The demultiplexers 111, 112 and latches 113, 114, 115, 116, are used to create 4-to-16 CENXX control signals 117. The axis information is internally multiplexed, but must interface to a non-multiplexed world. These CENXX signals 117 direct latches that retain compare values for a particular axis even when that axis is not selected in the load-count-store-advance cycle.

FIG. 19 shows how the CENXX signals 117 are used to either record the CDATA value for a particular axis, or retain the previous value of the output. Current output values are stored in latches 118,119,120,121. Two-to-one switches 122 receive as input either the current value of their output or the CDATA value representing the state of the currently selected axis. When that axis is selected, the 2-to-1 switch 122 drives the output bit. When the axis is not selected, the output bit is driven by its current value and remains unchanged.

FIG. 20 illustrates the output enable control 123, and shows how output compare values are driven externally. These outputs are buffered through tristate buffers 124 and only become active when the OUTPUT_ENABLED signal 125 is asserted. Leaving output signals in a tristate until they are deliberately enabled by the controller after internal levels have been set protects machines controlled by the system from any accidental actions during controller power-on.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A multiplexing decoder/counter circuit for monitoring quadrature position encoders comprising:

a plurality of external differential receivers, a counter means, switching means connected to said differential receivers, said switching means includes a selection capability equal to a maximum number of axes monitored by said circuit, an edge detector that processes information from said external differential receivers to determine a position of each of a plurality of axes being monitored by said circuit, an axis scanning state machine, a position counter memory block, a position readback memory block, a position capture memory block, and a position compare management memory block; wherein at least one of said position counter memory block, said position readback memory block, said position capture memory block, and said position compare management memory block is an addressable memory block, a depth of said addressable memory block is equal to the maximum number of axes monitored by said circuit; and wherein information from each of said external differential receivers is sequentially directed in said circuit by said switching means, and said axis scanning state machine at each position of said switching means simultaneously addresses at least said position counter memory block, said position readback memory block, said position capture memory block, and said position compare management memory block, a total loop frequency of a scanning sequence of said axis scanning state machine is equal to or greater than a maximum encoder frequency, such that said axis scanning state machine completes a total loop in less time than is required for encoder counts from the quadrature position encoders, at each visitation of a given memory address within said memory blocks, a state of said circuit is established, and any change in quadrature signals is recorded whereby any up or down count is accumulated to said position counter memory block, data describing said state of said circuit is then written back into said memory blocks, and said circuit advances to a succeeding memory location in said scanning sequence, thereby completing a load-count-store-advance cycle of said circuit; such that said switching means enables said counter means to be rapidly shared among the plurality of axes being monitored by said circuit.

2. The multiplexing decoder/counter circuit for monitoring quadrature position encoders of claim 1 wherein:

a synchronous writer stages data ahead of said memory blocks and then performs a write operation into said memory blocks at a time that will not disrupt operation of said circuit, said synchronous writer comprises a data register, an information target register and a demultiplexer that are used to identify a desired target memory block for said data, a number of an axis desired to receive said data is stored in an axis target register, a pending write event is indicated by a signal which goes high after said information target register has been written to, and wherein a comparator continually compares successive axis addresses to a stored axis address, and when an axis address matches said stored axis address, a write signal is generated that enables said circuit to write said data to said desired target memory block during a store state of said load-count-store-advance cycle.

3. The multiplexing decoder/counter circuit for monitoring quadrature position encoders of claim 1 wherein:

a shadow memory block is provided for at least one of said memory blocks, a depth of said shadow memory block is equal to a the maximum number of axes monitored by said circuit, said shadow memory block enables said circuit to safely read information in an associated memory block, said shadow memory block being switched to an off line state wherein it is removed from said load-count-store-advance cycle of said circuit so that data contained in said shadow memory block can be manipulated through a microprocessor of said circuit so that position information can be read, while in said off line state, write activity to said shadow memory block is inhibited so that data in said shadow memory block is stable, after said data is read, said shadow memory block is switched to an on line state, during which it is written with data from said associated memory block.

\* \* \* \* \*